F. R. CROTHERS.
Gang-Plows.

No. 152,464.

Patented June 30, 1874.

WITNESSES:

INVENTOR:
BY
ATTORNEYS.

UNITED STATES PATENT OFFICE.

FINLEY R. CROTHERS, OF SPARTA, ILLINOIS.

IMPROVEMENT IN GANG-PLOWS.

Specification forming part of Letters Patent No. 152,464, dated June 30, 1874; application filed March 14, 1874.

*To all whom it may concern:*

Figure 1:
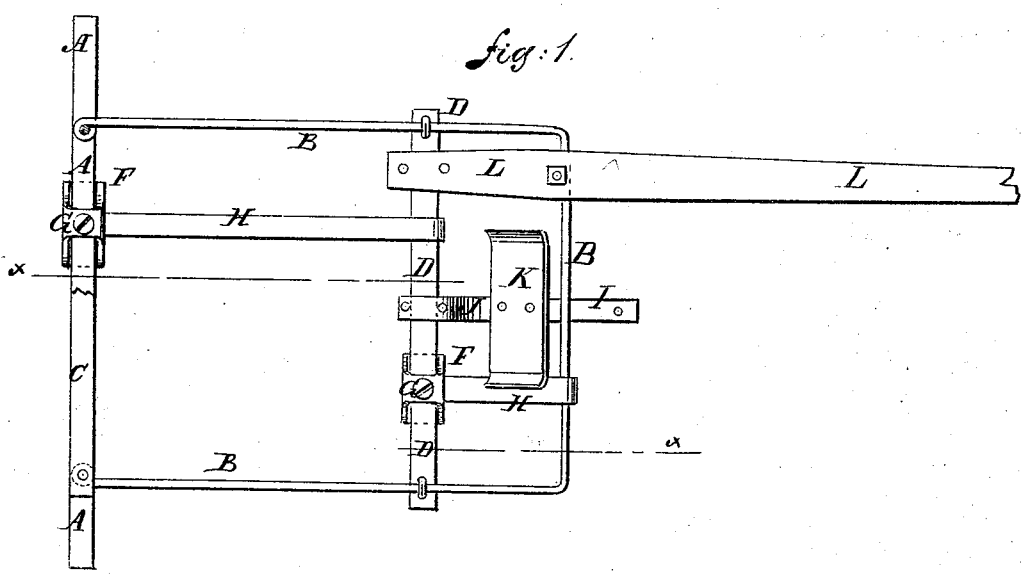
Figure 2:
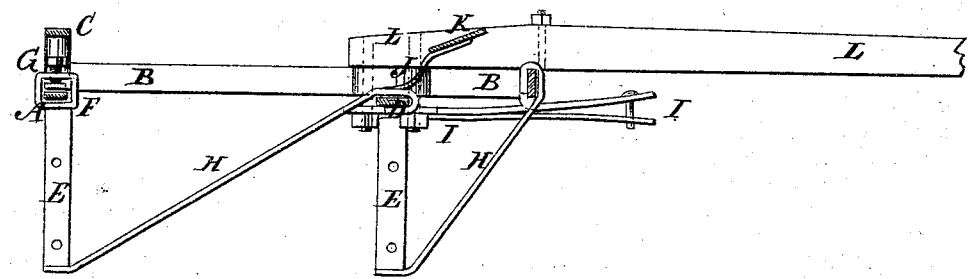
Figure 3:
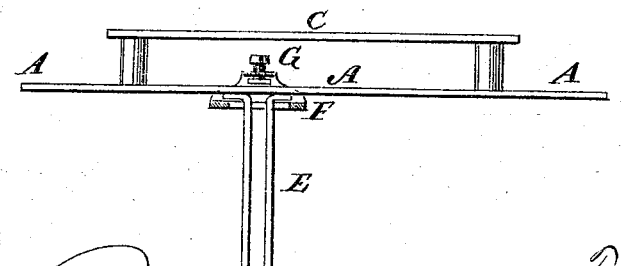

Be it known that I, FINLEY R. CROTHERS, of Sparta, in the county of Randolph, in the State of Illinois, have invented a new and useful Improvement in Gang-Plow, of which the following is a specification:

Figure 1 is a top view of the frame-work of my improved gang-plow, part being broken away to show the construction. Fig. 2 is a detail longitudinal section of the same, taken though the line $x\ x$, Fig. 1. Fig. 3 is a rear view of the same, the clamp being shown in section.

Similar letters of reference indicate corresponding parts.

My invention has for its object to furnish an improved gang plow, which shall be so constructed that the plows may be readily adjusted to cut wide or narrower furrows; which will allow the tongue to be moved toward either side, to adjust it for three horses while keeping it parallel with the line of draft, and without moving the line of draft from the center of the machine; and which shall be simple in construction and convenient in use. The invention consists in the combination of the clamps and their set-screws with the slotted standards to which the plow-beams are attached, and with the solid axle and the solid forward cross-bar of the frame, and in the bar that forms the main frame bent twice at right angles, to bring its forward part parallel with the axle and the forward cross-bar of the frame, to enable the tongue to be adjusted laterally while keeping it parallel with the line of draft as hereinafter fully described.

A represents the axle, which is made solid, and to which a short hinged arm is attached, upon which hinged arm the wheel revolves. The wheels are not shown in the drawings. B is a bar which forms the main frame of the machine, and which is bent twice at right angles to bring its forward part parallel with the axle A. The ends of the bar B are attached to the end parts of the axle A by short studs, the upper ends of which are connected and supported by a cross bar, C. To the side arms of the bar B, toward their forward ends, are attached the ends of a cross-bar, D. E are standards, which are slotted to receive the forward ends of the plow-beams, and have several holes formed in them to receive the pin or bolt for securing the forward ends of the plow-beams, so that by shifting the said pin or bolt from one to another of said holes the forward ends of the plow beams may be lowered and raised to cause the plows to work deeper or shallower in the ground, as may be desired. The upper ends of the standards E are secured—the rear standard to the axle A, and the forward standard to the cross-bar D—by clamps F, which slide upon the said axle and cross-bar, and are secured in place, when adjusted, by a set-screw, G, which said set-screws pass through the upper parts of said clamps, and their forward ends rest against the upper sides of the said axle and cross-bar, so that the plows may be adjusted to cut furrows of any desired width. By moving the rear clamp F to the right-hand side of the forward clamp F the machine is adjusted to receive left-hand plows. The draft strain upon the standards E is sustained by the brace-bars H, the rear ends of which are secured to the lower ends of the said standards E. The forward end of the rear brace H has an eye formed upon it to fit and slide upon the forward cross-bar D, and the forward end of the forward brace H has an eye formed upon it to fit and slide upon the forward part of the bar or frame B. I is the draft-bar, to the forward end of which the draft is applied, and the rear end of which is bolted to the forward cross-bar D. The bolts that secure the draft-bar I may also be used for securing the lower end of the spring-standard J, to the upper end of which is secured the foot-board or foot-brace K. L is the tongue, which is secured to the forward part of the bar B by a hook-bolt, and its rear end is secured to the forward cross bar D by two bolts and a yoke, so that by loosening the said bolts the tongue may be moved laterally to adjust it for the attachment of three horses abreast, while keeping it parallel with the line of draft, and without interfering with the attachment of the draft to the center of the machine.

Having thus described my invention, I claim as new and desire to secure by Letters Patent—

The clamp F, having a broad slot on its under side and adjustably secured to the cross-beam by set-screw G, in combination with the double bracket E, having hook-brace H, and right-angled flanges adapted to spring and catch in the slotted clamps, as shown and described, for the purpose specified.

FINLEY R. CROTHERS.

Witnesses:
REUBEN J. GODDARD,
ALBERT M. SPRAGUE.